United States Patent
Koskela et al.

(10) Patent No.: US 12,464,440 B2
(45) Date of Patent: Nov. 4, 2025

(54) CONTROL CHANNEL MONITORING RULES FOR INTER-CELL BEAM MANAGEMENT

(71) Applicant: Nokia Technologies Oy, Espoo (FI)

(72) Inventors: Timo Koskela, Oulu (FI); Sami-Jukka Hakola, Kempele (FI); Keeth Saliya Jayasinghe Laddu, Espoo (FI); Mihai Enescu, Espoo (FI); Juha Pekka Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 579 days.

(21) Appl. No.: 17/817,740

(22) Filed: Aug. 5, 2022

(65) Prior Publication Data

US 2023/0037605 A1    Feb. 9, 2023

Related U.S. Application Data

(60) Provisional application No. 63/230,478, filed on Aug. 6, 2021.

(51) Int. Cl.
*H04W 48/16* (2009.01)

(52) U.S. Cl.
CPC .................................. *H04W 48/16* (2013.01)

(58) Field of Classification Search
CPC .... H04W 48/16; H04B 7/0695; H04L 5/0094; H04L 5/0096
See application file for complete search history.

(56) References Cited

U.S. PATENT DOCUMENTS

| | | | | |
|---|---|---|---|---|
| 10,951,359 | B2 * | 3/2021 | Huang | H04W 72/23 |
| 2021/0051754 | A1 * | 2/2021 | Zhou | H04W 76/15 |
| 2021/0153085 | A1 * | 5/2021 | Rahman | H04L 5/0053 |

(Continued)

FOREIGN PATENT DOCUMENTS

| | | |
|---|---|---|
| CN | 113170335 A | 7/2021 |
| WO | WO-2021090204 A1 | 5/2021 |

OTHER PUBLICATIONS

Futurewei, "Enhancement on multi-beam operation," 3GPP TSG RAN WG1 Meeting 105-e, R1-2104205, e-Meeting, May 19-27, 2021. 11 pages.

(Continued)

*Primary Examiner* — Charles N Appiah
*Assistant Examiner* — Frank E Donado
(74) *Attorney, Agent, or Firm* — Duft & Bornsen, PC (57) ABSTRACT

Methods and apparatus, including computer program products, are provided for control channel monitoring. In some example embodiments, there may be provided a method that includes receiving, at user equipment, an indication of a codepoint activation, wherein the codepoint activation indicates that a transmission configuration indicator state being activated is associated with a second physical cell identifier different from a first physical cell identifier of a serving cell of the user equipment, and in response to the transmission configuration indicator state being activated in association with the second physical cell identifier, suspending control channel monitoring of at least one set of core resources associated with the first physical cell identifier of the serving cell of the user equipment. Related systems, methods, and articles of manufacture are also disclosed.

18 Claims, 7 Drawing Sheets

(56) References Cited

U.S. PATENT DOCUMENTS

2022/0322207 A1* 10/2022 Agiwal ................ H04L 1/1822
2023/0042828 A1*  2/2023 Uchino ............. H04W 74/0833

OTHER PUBLICATIONS

Samsung, "Revised WID: Further enhancements for MIMO on NR," 3GPP TSG RAN Metting #92e, e-Meeting, Jun. 14-18, 2021. 6 pages.
International Searching Authority and Written Opinion at the European Patent Office for International Application No. PCT/EP2022/071891, mailed Nov. 11, 2022 (Nov. 11, 2022). 16 pages.

* cited by examiner

CONTROL CHANNEL MONITORING RULES FOR INTER-CELL BEAM MANAGEMENT

RELATED APPLICATION

This application claims priority to U.S. Provisional Application No. 63/230,478 entitled "CONTROL CHANNEL MONITORING RULES FOR INTER-CELL BEAM MANAGEMENT," and filed on Aug. 6, 2021, the disclosure of which are incorporated herein by reference in their entirety.

FIELD

The subject matter described herein relates to wireless communications.

BACKGROUND

In 5G's New Radio (NR), the system may operate with beam based operation at above the 6 GHz carrier frequency range as well as below 6 GHz. When this is the case, the transmitter and the receiver may operate using spatial domain beamforming (e.g., in the analog domain, in the digital domain, or a combination of both) to cover the propagation loss associated with the radio channel. Moreover, the user equipment may include multiple receive antenna panels, in which each antenna panel includes an antenna elements and/or beamforming module. Depending on the user equipment's reception capability, a set of antenna panels (at the user equipment) may be used for simultaneous reception of a downlink from the network, such as a gNB base station or other type of cellular base station.

SUMMARY

In some example embodiments, there may be provided a method that includes receiving, at the user equipment, an indication of a codepoint activation, wherein the codepoint activation indicates that a transmission configuration indicator state being activated is associated with a second physical cell identifier different from a first physical cell identifier of a serving cell of the user equipment; and in response to the transmission configuration indicator state being activated in association with the second physical cell identifier, suspending control channel monitoring of at least one set of core resources associated with the first physical cell identifier of the serving cell of the user equipment.

In some variations, one or more of the features disclosed herein including the following features can optionally be included in any feasible combination. The user equipment may monitor another control channel associated with the transmission configuration indicator state being activated for the second physical cell identifier. The monitoring may include transmission configuration indicator activations for a physical downlink shared channel associated with the second physical cell identifier. The user equipment may monitor at least one other set of core resources associated with the transmission configuration indicator state within the second physical cell identifier of a non-serving cell. The suspending may further include suspending the monitoring of a search space set (for DCI, downlink control information, candidates) on the at least one set of control resource set resources associated with the first physical cell identifier of the serving cell of the user equipment. A timer may be configured to provide a time during which the user equipment ignores at least one transmission configuration indicator state change that is not within the second physical cell identifier. Based on the expiry of the timer, applying the at least one transmission configuration indicator state change that is not within the second physical cell identifier. When the user equipment is configured to monitor the data channels from two different cells, the user equipment may be configured to apply, to the data channels from the two different cells, at least one transmission configuration indicator state. The suspending may further include: excluding at least a first reference signal for beam failure detection associated with the first physical cell identifier of the serving cell; and/or including at least one other reference signal for beam failure detection associated with the second physical cell identifier of a non-serving cell. The suspending may be in response to a trigger received by the user equipment or a condition detected by the user equipment; and in response to the trigger or the condition, the user equipment may monitor another control channel associated with the transmission configuration indicator state being activated for the second physical cell identifier.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In 3GPP Release 17, beam management enhancements may include the enhancement of a Transmission Configuration Indicator (TCI) state so that the TCI state can contain reference signals (RS) associated with a specific physical cell identifier (PCI). For example, the TCI state can be associated with a specific cell (or its corresponding PCI), and this specific call may be a non-serving cell of the UE. In some cases for example, a non-serving cell (or in this context a cell that is not configured as serving cell i.e. is not configured with a serving cell identifier but may be still used as cell that UE communicates with) may be referred as an assisting cell, an inter-cell beam management, an inter-cell mTRP cell, or the like. In some cases for example, the UE may have a serving cell configuration and a non-serving cell (or assisting cell) may be configured, which can be used for communication (transmission and/or reception) in a manner that the serving cell is not changed for the UE but the UE may communicate with the non-serving/assisting cell while still being associated (e.g. in terms of RRC configuration) with the serving cell. However, in prior releases (e.g., 3GPP Releases 15 and 16), the TCI state (which may contain the downlink (DL) reference signal (RS) such as the synchronization signal block and/or channel status information (CSI)-RS) has been associated with only a serving cell index (e.g., either the primary cell (PCell) or the secondary cell (SCell)). Thus, the Release 17 TCI state enhancement may alleviate this prior restriction, such that the TCI state can be associated with non-serving cells (as indicated by for example the PCI of the non-serving cell). The motivation for such an enhancement may be to provide opportunity for a quick change of reception point, such as transmit-receive points (TRPs) that may be associated with a different cell (or PCI) on the same carrier frequency as the serving cell. In other words, when a TCI state is associated with a PCI, it allows the downlink reference signal (DL RS) to be associated with any specific cell within the beam management framework, so the UE can be instructed to receive the physical downlink control channel (PDCCH) from a non-serving cell and/or an assisting cell (which is not a serving cell). This may be referred as dynamic point selection, so instead of handing over to another cell from the radio resource control (RRC) perspective, the reception and transmission of control and data channels can be made in the lower layers without associating the UE with a new cell at RRC level (e.g., without handing UE to another cell).

However, the UE may have limited capability in terms of simultaneous reception of multi-TRP (mTRP) operation in case of inter-cell operation. In some scenarios for example, the timing difference between serving cell and non-serving cell may be too large and/or the UE may have limited capability in terms of antenna panel operation (e.g., a limited amount of antenna panels can be active for reception/transmission concurrently). Alternatively, or additionally, the UE requirements for layer 1 (L1) and/or layer 2 (L2) inter-cell beam management may be designed, so that the UE is not required to support activation of TCI states for more than one cell (on the same carrier frequency/intra-frequency) simultaneously. For inter-cell beam management for example, a UE may transmit to, or receive from, only a single cell (e.g., a serving cell does not change when beam selection is done); this may also include L1-only measurement/reporting (e.g., without Layer 3 (L3) impact) and beam indication associated with cell(s) with any physical cell ID(s). Accordingly, there may be an issue regarding whether a beam indication (under the 3GPP Release 17 regime, for example) may allow the activation of TCI states with different physical cell identities (PCIs) simultaneously so that the activated TCI state can be indicated using downlink control indicator (DCI) based signaling.

The TCI states may be active for the DCI based beam indication for the MAC Control Element (CE) activations with different and/or more than one physical cell identity (PCI) even though the UE may not support or may have limited support for simultaneous communication (transmission and/or reception of data/control channels) with more than one cell at a time on the same carrier frequency. For example, the UE may not be able (or it would not be required) to monitor the PDCCH on more than one cell on the same carrier frequency at a time. In 3GPP Releases 15 and 16, there was no issue since that beam management framework considered only the transmission/reception communication within the serving cells and one serving cell at a time on the same carrier frequency.

There are disclosed UE PDCCH monitoring rules for inter-cell beam management scenarios.

In some example embodiments, there may be provided support for inter-cell beam management within the 5G (also referred to herein as New Radio, NR) beam management framework. For example, when the UE is not presumed to operate with simultaneously active TCI states for core resource sets (CORESETs) and the RS indicated by the TCI states are directly or indirectly quasi-co-located (QCL) with RSs in different cells (as, e.g., identified by the PCI). The UE's operation may not yet have been defined when the PDCCH transmission of one CORESET is associated with a first PCI value (e.g., identifying a first cell) and another CORESET is associated with a second PCI (e.g., identifying a second cell). In this example, the UE's actions may be managed when the UE receives the DCI based TCI state indication for a new TCI state associated with the RS of another cell, such as a non-serving cell. With respect to the examples or embodiments considering the TCI state indication (for of the PDCCH, PDSCH, PUCCH, and/or PUSCH), the TCI state indication may be done using a DCI or MAC CE based methods. For example, the MAC CE based method may directly activate the UE's PDCCH reception for a CORESETs, whereas in the DCI based indication the UE may be indicated from a set of TCI states that may have been activated (and/or pre-activated) using MAC CE or any higher layer signaling (such as RRC). To keep the network and the UE in-sync in cases where the PDCCH monitoring on different CORESETs (which are associated with different PCIs of, e.g., different cells), specific actions or rules may be defined for the UE in situations where the UE is not able (or not required) to monitor the PDCCH on more than one cell at a time.

In some example embodiments, there is provided UE monitoring rules for inter-cell beam management. For example, when (1) the UE receives a DCI indication for a new TCI field codepoint that activates the TCI state for the PDCCH for a subset of CORESET(s) and (2) the RS indicated by the activate TCI state is associated with a second PCI value (e.g. a non-serving cell or assisting cell or inter-cell BM cell) that is different from a first PCI value (e.g., of the serving cell), the UE may suspend the PDCCH monitoring of at least one CORESET associated with a TCI state associated with the first PCI value (e.g., of the serving cell). This TCI state may include a Quasi-Colocation (QCL) source reference signal (RS) associated with the first PCI value (e.g. of a serving cell). Although the UE's activation of the UE's PDCCH reception of a CORESET may be activated via the DCI (DCI indicates the activated TCI state), the UE's activation of the UE's monitor of the PDCCH for a (subset of) CORESET(s) may, as noted, also be performed via the MAC CE.

Figure 1A:
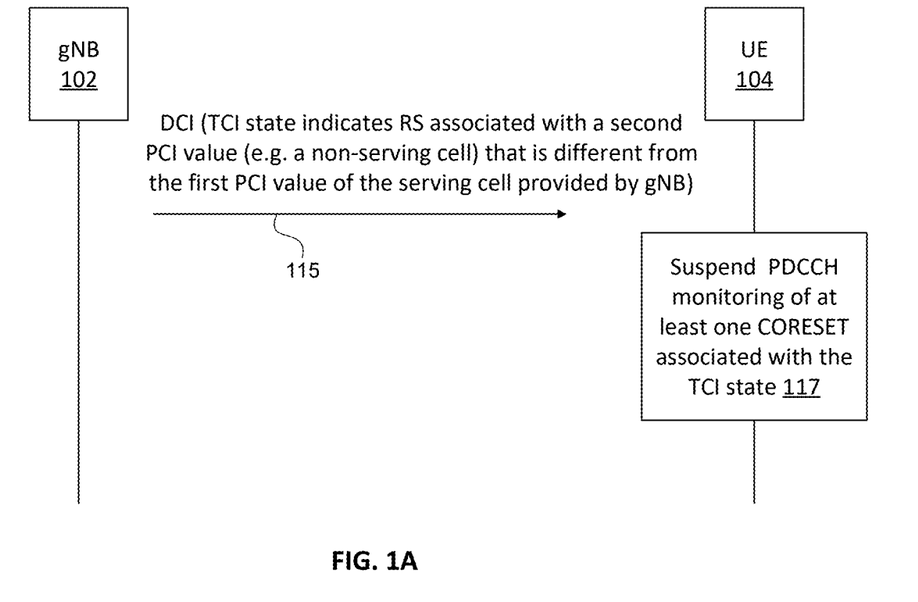
FIGS. 1A-1B depict examples of flow diagrams including a base station and a user equipment configured with control channel monitoring rules, in accordance with some example embodiments.

FIG. 1A depicts an example of a flow diagram including a base station, such as a gNB base station 102, and a user equipment 104, in accordance with some example embodiments.

At 115, the UE 104 receives, via the DCI, an indication of a TCI codepoint activation, and this codepoint indicates that the TCI state being activated is associated with a second physical cell identifier (PCI) value that is different from a first PCI value of the serving cell, which in this example is the serving cell being served by gNB 102. The TCI state may include one or more parameters for configuring a quasi co-location (QCL) relationship between a downlink reference signal (RS) and a demodulation reference signal port. As an example, the QCL relationship indicates to the UE that 2 signals (or channels) may share the same assumption for channel characteristics/parameters such as Doppler shift, Doppler spread, average delay, delay spread, or spatial RX (same RX beam at UE side).

At 117, the UE 104 may suspend the PDCCH monitoring of at least one CORESET associated with a TCI state of the serving cell (or the first cell). For example, the UE 104 may suspend monitoring of a reference signal (RS) for the first PCI value of the serving cell. The suspension of the monitoring may be in response to receiving 115. At 117, the UE 104 may, however, monitor the PDCCH monitoring of at least one CORESET associated with a TCI state of the second PCI value of the non-serving cell (or the second cell).

In some embodiments, the suspension of the CORESET monitoring, at 117, may include other aspects as well. For example, the UE 104 may not be required to monitor the PDCCH candidates of a search space set (SSS) of any of the CORESETs with active TCI state indicating a RS associated with the first PCI value, such as the serving cell. For example, the UE may suspend monitoring of any CORESET with an active TCI state indicating the RS associated with a cell that is not the same as the latest cell associated with the indicated TCI state (which in the example of FIG. 1A is the second PCI value of the non-serving cell).

Moreover, the UE 104 may assume the CORESET and any functions (such as PDCCH monitoring) for the CORESET of the first PCI value are suspended. Suspended may further mean that the PDCCH monitoring parameters for the CORESET are not de-configured. For example, the UE may assume the configuration for the search space is not removed but the UE is not required to monitor any DCI formats for the search space. Alternatively, or additionally, the UE 104 may assume no change to the suspended configuration but is configured to deprioritize any search space configuration associated with the serving cell.

Although in the example of FIG. 1A, the UE 104 suspends monitoring of the CORESET associated with the first PCI value of the serving cell, the UE may monitor (or may be configured to monitor by the network) other CORESETs, so long as the indicated TCI states are within the same PCI (as the latest indicated PCI, such as the second PCI value of the non-serving cell of the example of FIG. 1A noted above). And, the UE may be expected to receive TCI state activations for other channels (e.g., of the physical downlink shared channel, PDSCH) associated with the same PCI, wherein the same PCI is of, for example, the non-serving cell.

In the example of FIG. 1A, when UE 104 receives, at 115, via the PDCCH a DCI that indicates a TCI field codepoint, this activates a TCI state for the CORESET and the TCI state indicates an RS associated with the first PCI value. The different TCI states at the UE may be activated or deactivated via the use of codepoints in the DCI (see, e.g., 3GPP TS 38.321). In the example of FIG. 1A, the process may reduce UE complexity for monitoring rules, such as how search space prioritization would be done for serving and non-serving cells, as the UE is not required to monitor PDCCH on more than one cell at a given time, even though the PDCCH transmissions are associated with more than one cell. This may also reduce network complexity and signaling since the network does not need to re-configure any parameters for PDCCH monitoring (such as search space related parameters) for one or more of the CORESETs when those are associated with different cells (e.g. through the TCI state activation) since a rule set has been agreed between the network, such as gNB base station 102 and the UE 104.

With respect to suspending of PDCCH monitoring by the UE 104 on at least one CORESET (which is not associated with the same PCI as the PCI of the latest indicated TCI state) as noted above with respect to FIG. 1A, there may be, in accordance with some example embodiments, a time gap configured during which the UE is expecting not to receive consecutive TCI state changes that are not within the same PCI. Alternatively or additionally, when the UE is configured for inter-cell beam management operation (such as point selection between one or more cells where the PDCCH monitoring, or any of downlink or uplink control/data channels are switched between cells) there may be, in accordance with some example embodiments, a time gap configured during which the UE is expecting not to receive consecutive TCI state changes that are not within the same PCI. For example, during the time gap, the UE expects to receive consecutive TCI state changes that are within the same PCI, but not in another PCI such as in the first PCI of the serving cell of FIG. 1A. To illustrate further, the UE may get (e.g., via a MAC-CE activation as described in 3GPP TS 38.214, Release 17) up to a certain (e.g., N) quantity of TCI states (e.g., 8 or less) activated and more than one PCI may be associated with the activated TCI states and the DCI-based indication of a TCI state with a PCI other than the current PCI is allowed and/or configured. When this is the case, the UE may be configured with the noted time gap, during which the UE is expecting not to receive consecutive TCI state changes that are not within the same PCI. Moreover, different DCIs (e.g., prior to HARQ feedback for the DCI based indication of a TCI state) should not indicate other TCI states with different PCIs. For example, the UE may be configured to just ignore any TCI state changes received during the gap that are from a different PCI (e.g., a PCI that is different from the second PCI for the non-serving cell). Alternatively, or additionally, this TCI state with the different PCI may be applied by the UE after the expiry or end of the time gap. This time gap (or time period) corresponds to a time where the UE does not expect to receive or is not required to apply the TCI state indications that are not within the same PCI. The time gap or time period may start when the UE receives the indication of a TCI state associated with a different PCI than the first cell (or the currently indicated cell that the UE is communicating with). Alternatively, the time period or time gap may start after the UE has acknowledged the TCI state indication or applied the configuration/indication of the new TCI state. In any of the examples herein the time gap may be applied when UE is indicated a new TCI state associated with the second PCI and the current TCI state is associated with the first PCI (and vice versa). Similar operation can be extended for multiple PCIs (more than 2 PCIs).

Figure 1B:
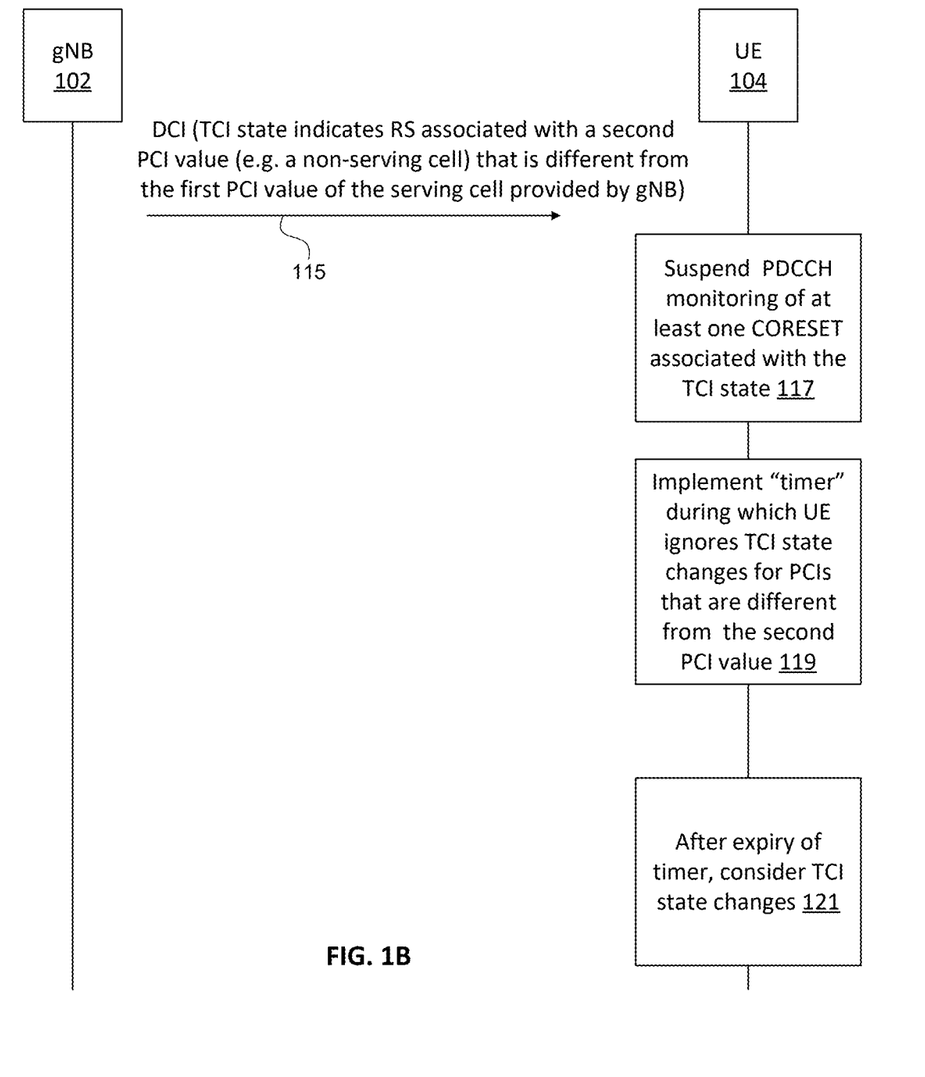

FIG. 1B depicts an example of a flow diagram which is similar to FIG. 1A but further depicts the use of a timer, in accordance with some example embodiments. At 119, the UE 104 may be configured with a timer set to the noted time gap. During this period of the timer, the UE may be configured to allow consecutive TCI state changes that are within the same PCI (e.g., the second PCI value of the non-serving cell), but not in other PCI values of other cells. For example, the UE may, at 119, ignore TCI state changes for other PCI values of other cells (which are different from the current or latest PCI value of the second PCI value of the non-serving cell, for example). However, after the expiry of the timer at 121, the UE may be configured to again consider the TCI state changes even if the PCI changes are for other PCI values of other cells.

In the example of FIG. 1B, the process may reduce UE complexity as the UE cannot be expected to be able to, for example, receive PDCCH activation/reception commands for different cells, so the UE may be able to, for example, optimize beam measurement such that the UE can reserve more time for a current cell indicated by the current PCI value, such as the second PCI value of the non-serving cell.

Figure 2:
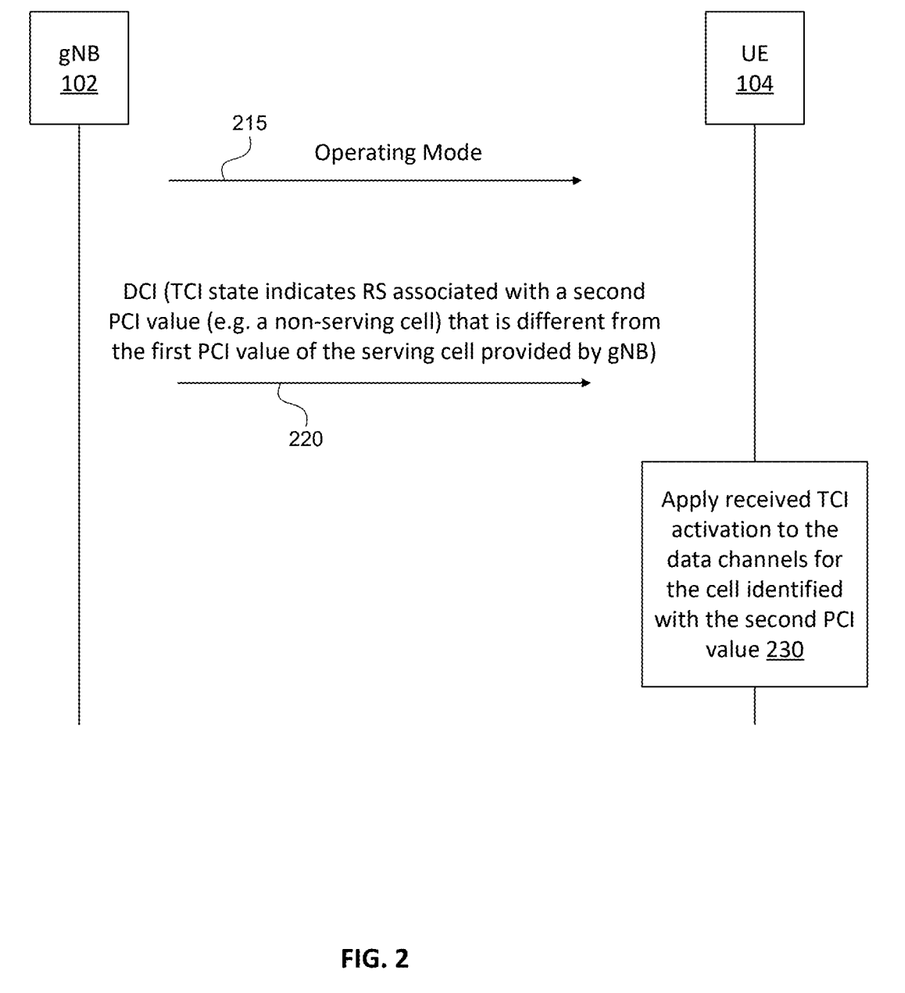
FIG. 2 depicts an example of a flow diagram for a specific mode configured at the user equipment for applying TCI state fields only to data channels, in accordance with some example embodiments.

When the UE is configured to monitor only the data channels from two different cells, the network may configure the UE to operate in a specific operation mode. In this specific operation mode, the UE may, in accordance with some example embodiments, know that any of the DCI-indicated TCI state fields apply only to data channels (e.g., the physical uplink shared channel (PUSCH)/physical downlink share channel (PDSCH)) but not control channels, such as the PDCCH. FIG. 2 depicts an example of a flow diagram illustrating this specific mode of operation, in accordance with some example embodiments. At 215, the UE 104 may be configured by the network to operate in the noted specific operating mode. When this is the case, when the UE receives, at 220, activation for a TCI field codepoint pointing a TCI state with a second PCI value to for example a non-serving cell, the UE may know that the TCI state only applies, at 230, to the data channels for the cell identified with the second PCI value, rather than to the control channel such as the PDCCH. In the example of FIG. 2, this operation mode (which may be configured by the network via the gNB 102) may allow operation where the UE does not expect to monitor PDCCH on another cell.

Referring again to the example of FIG. 1A where the UE 102 suspends the CORESET/PDCCH monitoring (based on the associated PCI for the DCI based TCI field codepoint indication), the UE may, in accordance with some example embodiments exclude the QCL-TypeD reference signal (RS) (which is indicated by the active TCI state for a CORESET) from the beam failure detection RS set of q0 associated with the first PCI value, and include only the RS associated with second PCI value.

Figure 3:
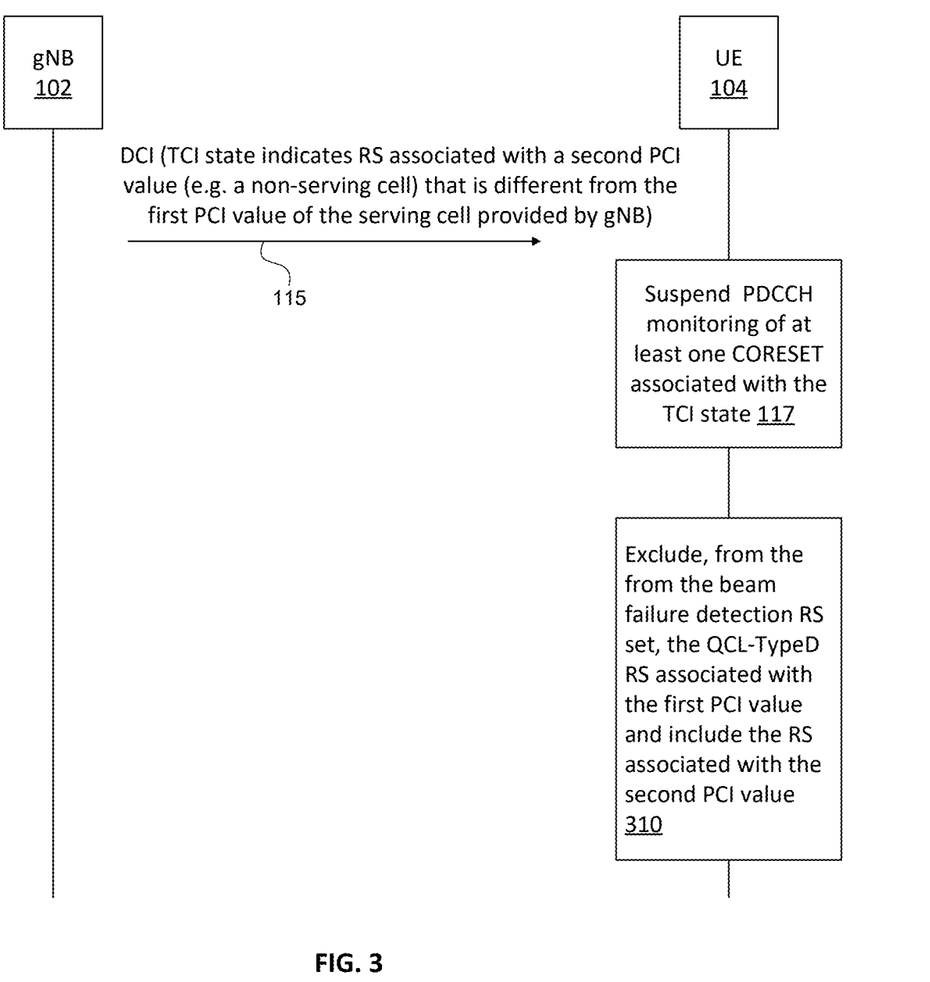
FIG. 3 depicts an example of a flow diagram for excluding and including certain reference signals, in accordance with some example embodiments.

FIG. 3 depicts an example of a process flow that is similar to the process flow of FIG. 1A, but shows the UE configured to exclude and include certain reference signals (RS). In 3GPP TS 38.214 for example, the antenna ports QCL may be defined in accordance with four different types as follows: QCL-TypeA (having similar Doppler shift, Doppler spread, average delay, delay spread); QCL-TypeB (having similar Doppler shift and Doppler spread); QCL-TypeC (having similar average delay and Doppler shift); and QCL-TypeD (having similar Spatial Rx parameter). At 310, the UE may exclude a QCL-TypeD reference signal (RS) (which is indicated by the active TCI state for a CORESET) from the beam failure detection RS set of q0 that is associated with the first PCI value and include only the RS associated with second PCI value. The UE may be configured with a set of RS resources (a set q0 RS) for beam failure detection, such that the UE measures link quality for purposes of indicating a beam failure, based on the RS of set q0. In the example of FIG. 3, when the TCI state is activated for the CORESET, the RS previously indicated (with different PCI than the latest indicated TCI state) by the TCI state is excluded in the set of q0. In other words, the UE includes the RS in the set of q0 based on the latest PCI, which is indicated by the DCI based TCI field codepoint indication. For example, the UE includes the RS in the set of q0 based on the latest indicated PCI, which is indicated by the TCI state indication. In this way, only the RS of one PCI is included in the set, when only one set of q0 is configured. In the example of FIG. 3, the beam failure detection RS set is correctly provided on active PDCCH channels.

In some example embodiments, the UE may determine TCI state monitoring based on the PCIs, wherein only one PCI value is considered to be active for monitoring of the PDCCH. For example, the one PCI value for monitoring purposes may be determined based on for example, the lowest, highest, specific, and/or configured CORESET ID. To illustrate further, when the TCI state is activated for a specific CORESET ID (which may be predetermined), the CORESET ID may define a primary PCI, when determining whether to suspend monitoring as noted in the example of FIG. 1A. In this example, if the TCI state is activated for a CORESET identified as CORESET ID 2 and this CORESET ID 2 has a PCI different from the associated PCI of an RS of an active TCI for the primary CORESET ID such as CORESET ID 1, the TCI state is considered to be indicated for CORESET ID 2 but not yet "active" (e.g., active in the sense the UE is not required to monitor the PDCCH on the CORESET). As an example, when the UE receives a TCI state indication for a CORESET ID 2 that is not the leading CORESET or primary CORESET), the UE applies the configuration but considers the configuration not yet to be active (e.g., in terms of PDCCH monitoring), if the activated TCI state for a CORESET is associated with a different PCI than the primary CORESET. In an example, if the network activates a TCI state for the primary CORESET (e.g. the CORESET ID 1) and the PCI associated with activated TCI state for CORESET ID 2 is now the same as for the primary CORESET, UE assumes the TCI state as applied i.e. active for PDCCH monitoring. In other words, any CORESET that has been activated with a TCI state with a different PCI than the leading (or primary) CORESET, is ignored for the PDCCH monitoring. In this example, signaling overhead reduction and latency may be reduced, and PDCCH monitoring ambiguity is eliminated in case of multiple CORESETs with different PCI associations. For example, the methods herein may apply for all CORESETs or the CORESET #0 (CORESET ID 0) may be excluded. CORESET ID 0 refers to a special CORESET used for monitoring (e.g., system information broadcast signaling in the cell).

Figure 4:
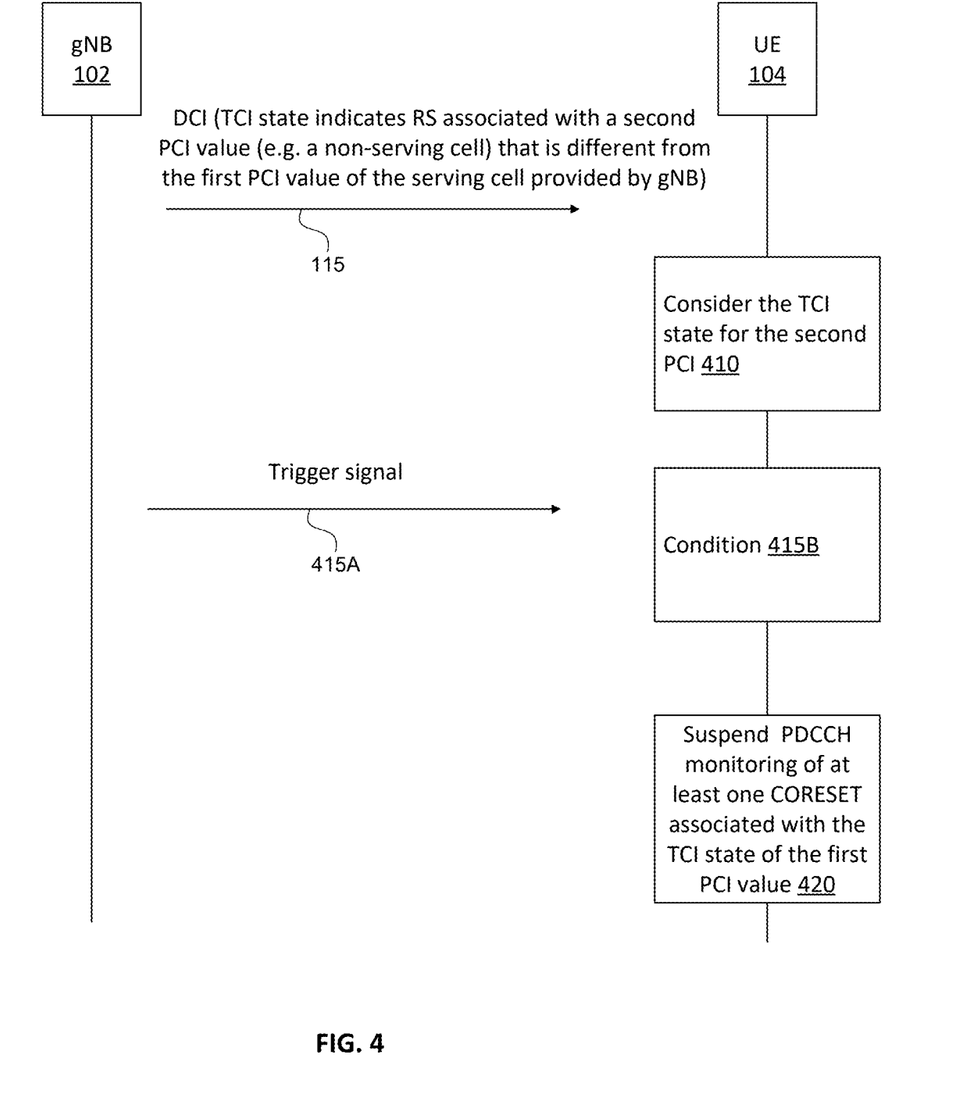
FIG. 4 depicts an example of a flow diagram for activating a TCI state based on a trigger signal or condition, in accordance with some example embodiments.

In some example embodiments, the TCI state may be considered activated for a CORESET based on the DCI indication for a TCI field codepoint, but is not used or applied until a further trigger signal and/or condition is applied, when the DCI indicates a TCI state with a second PCI value. FIG. 4 depicts an example of a process using the further trigger signal/condition, in accordance with some example embodiments. At 115, the UE receives a DCI that activates a TCI state for a PCI value, such as the non-serving cell. In this example, the UE considers the TCI state indicated for the second PCI value but the UE is not required to monitor the PDCCH until a separate activation is triggered. At 415A-B, a trigger signal (e.g., a separate MAC CE or a DCI) message is shown. Alternatively, or additionally, the trigger may be a condition, such as at 415B, an example of which is a PDCCH order (and therefore completion of RACH procedure) where the target reference signal (RS) is associated with the second PCI value. In response to 415A and/or 415B, the UE may suspend, at 420, PDCCH monitoring of the CORESET associated with the first PCI value, and monitor the CORESET associated with the second PCI value. In the process of FIG. 4, there may be provided a signaling overhead reduction and/or a latency reduction, as well as less PDCCH monitoring ambiguity in cases with multiple CORESETs.

In some example embodiments, when the UE receives activation of at least one TCI state (which indicates an RS associated with a second PCI value for at least one CORESET) the UE assumes implicitly the same QCL relationship for downlink control channels (PDCCH) for other CORESETs that were previously associated with an RS with a first PCI value. For example, the UE may assume the QCL source (e.g., QCL-typeD assumption) for PDCCH DMRS associated with other CORESETs (e.g., of the serving cell/first cell) based on the RS indicated by the activated TCI state for the CORESET. Herein, the UE may also assume the QCL assumptions updated for other channels (such as PDSCH, PUCCH, PUSCH, etc.) based on the indicated RS by the TCI state for a CORESET. For example, the UE may assume that all the spatial relation RS for uplink control/data channels is assumed to be the RS indicated by the TCI state. This assumption may be used until reconfigured by the network. In a further example, when a TCI state is activated for a specific CORESET ID that is associated a different PCI than the current PCI (i.e. TCI state indicates association with PCI2 while currently the PDCCH reception is associated with PCI1), the UE may assume the QCL source (e.g., QCL-typeD assumption) for PDCCH DMRS associated with one or more other CORESETs (e.g., of the serving cell/first cell associated with PCI1) based on the RS indicated by the activated TCI state for the CORESET. In some example embodiments, similar operation can be expanded to a scenario comprising the one serving cell, wherein the one non-serving cell case expands further to N-non-serving cells. The RS indicated by the latest activated TCI state (which points a second PCI value) determines the PDCCH DMRS QCL-typeD assumptions monitoring for other CORESETs, when the RS is associated with a cell identifier (PCI) not currently associated with any of the RS indicated by the current active TCI states. In this example, signaling overhead reduction and latency may be reduced (given, for example, the UE can be assigned to monitor PDCCH on all CORESETs in the same cell with a single message based on the agreements) as well as PDCCH monitoring ambiguity reduction in the case of multiple CORESETs. Furthermore, in case the one or more of downlink data channel, uplink data channel, and uplink control channel are assigned to be received/transmitted on the same cell, it may reduce signaling latency and overhead.

In some of the example embodiments disclosed herein, the non-serving cell may refer to an inter-cell mTRP cell, an assisting cell in inter-cell beam management, an inter-cell beam management cell, and/or the like. The serving cell may be referred to with the serving cell index and typically only one serving cell is configured for each carrier frequency. In case of inter-cell beam management or inter-cell multi-TRP, the UE may have one or more cells configured for communication purposes (TX/RX), wherein there is (from configuration perspective) one serving cell and other cells are considered as assisting/supporting cells or non-serving cells or any cell that is configured for inter-cell communication on the same carrier (or in some cases on different carrier).

In some of the example embodiments disclosed herein the UE may be configured to indicate to the network whether the UE has limited operation capability for L1/L2 centric inter-cell mobility or inter-cell beam management. In response to the indication to the network, if the UE is configured with inter-cell beam management, the UE may automatically assume the operation mode described herein regarding the TCI state activation (that indicates reception of PDCCH according to the reception assumption from a non-serving cell) for a CORESET. The configuration with inter-cell beam management (or L1/L2 centric mobility) may mean that at least one DL RS is configured, as the TCI state for PDSCH/PDCCH is associated directly or indirectly with the non-serving cell identifier (such as the PCI). Moreover, if DCI based mobility is not allowed, the MAC-CE activation may not need to have TCI states of different PCIs. And, MAC-CE activation for DCI based beam indication (e.g. indicating a TCI state) may be considered as the L1/L2 mobility trigger. In case the DCI based beam indication is considered as a mobility trigger, it may cause the UE to handover to the cell with the PCI indicated by the TCI state. The handover may cause the UE to apply preconfigured information on the indicated target cell (based on PCI) such as conditional handover configuration. Moreover, when the UE receives TCI state activation for a CORESET that indicates a PCI different from the current PCI and the UE is configured to suspend monitoring of TCI states that indicate a PCI other than the PCI indicated by the RS by the most recent TCI activation, the UE may start a timer. When the timer is running, the UE may continue to monitor at least one DCI format and at least on the SS of the CORESET. But when the timer expires, the UE suspends monitoring of the "old PDCCH beam(s)" as described herein.

In some example embodiments, the QCL-typeD assumption for the PDCCH DMRS for CORESET #0 is determined based on the latest activated TCI state, or the QCL-typeD source RS (SSB) of the RS indicated by the active TCI state, when the RS indicated by the TCI state is associated with the second PCI value. In other words, the UE determines the CORESET #0 monitoring (i.e., in terms that which cell the UE uses for CORESET ID 0 monitoring) based on the latest indicated PCI value. In some example embodiments, the QCL-typeD assumption for the PDCCH DMRS for CORESET #0 is determined based on the first indicated TCI state associated with the second PCI value (or when the PCI value is different than the current assumed PCI value for the CORESET monitoring) or the QCL-typeD source RS (SSB) of the RS indicated by the active TCI state, when the RS indicated by the TCI state is associated with the second PCI value (or when the PCI value is different than the current assumed PCI value for the CORESET monitoring).

In some example embodiments, similar operation can be expanded to a scenario comprising the one serving cell, wherein the one non-serving cell case expands further to N-non-serving cells. The RS indicated by the latest activated TCI state (which points to a second PCI value) determines the PDCCH DMRS QCL-typeD assumptions monitoring for other CORESETs, when the RS is associated with a cell identifier (PCI) not currently associated with any of the RS indicated by the current active TCI states.

Figure 5A:
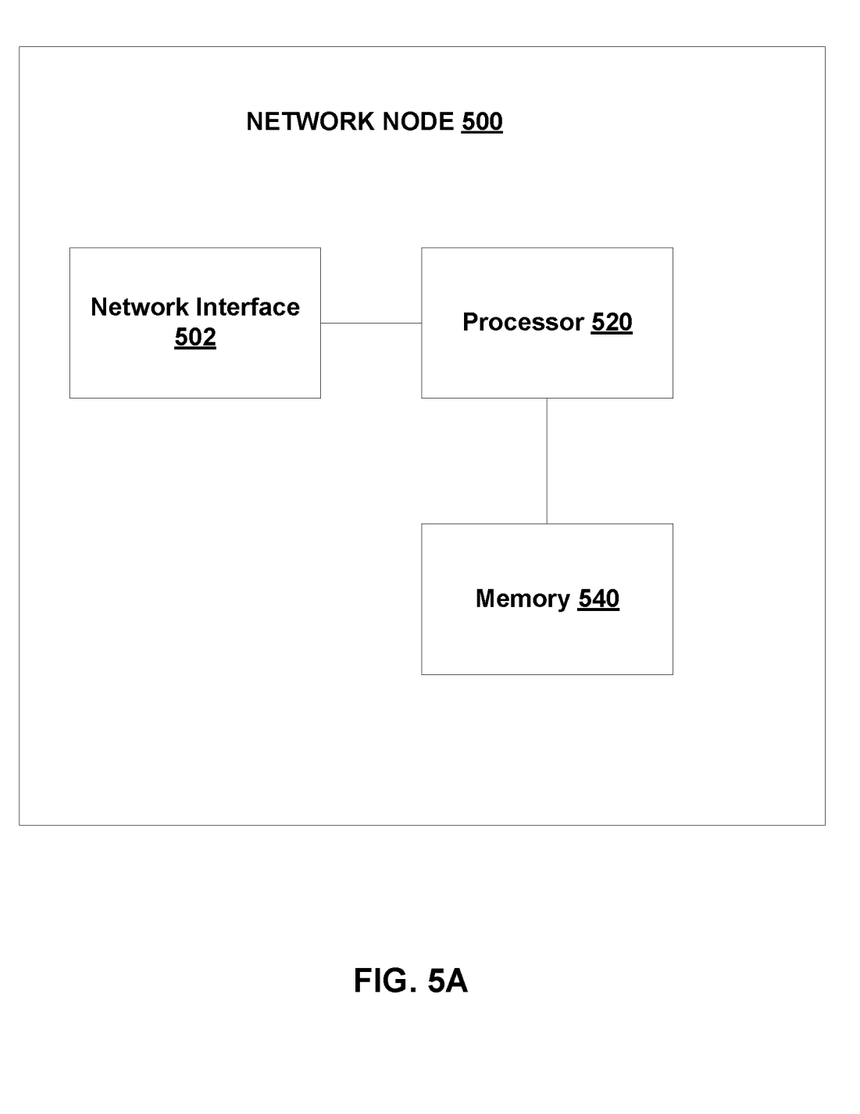
FIG. 5A depicts an example of a network node, in accordance with some example embodiments.

FIG. 5A depicts a block diagram of a network node 500, in accordance with some example embodiments. The network node 500 may be configured to provide one or more network side nodes or functions, such as a base station an example of which is the gNB 102 noted above. For example, the network node may be configured to at least send an indication of a codepoint activation, wherein the codepoint activation indicates that a transmission configuration indicator state being activated is associated with a second physical cell identifier different from a first physical cell identifier of a serving cell of the apparatus.

The network node 500 may include a network interface 502, a processor 520, and a memory 540, in accordance with some example embodiments. The network interface 502 may include wired and/or wireless transceivers to enable access to other nodes including base stations, other network nodes, the Internet, other networks, and/or other nodes. The memory 540 may comprise volatile and/or non-volatile memory including program code, which when executed by at least one processor 520 provides, among other things, the processes disclosed herein with respect to the network nodes.

Figure 5B:
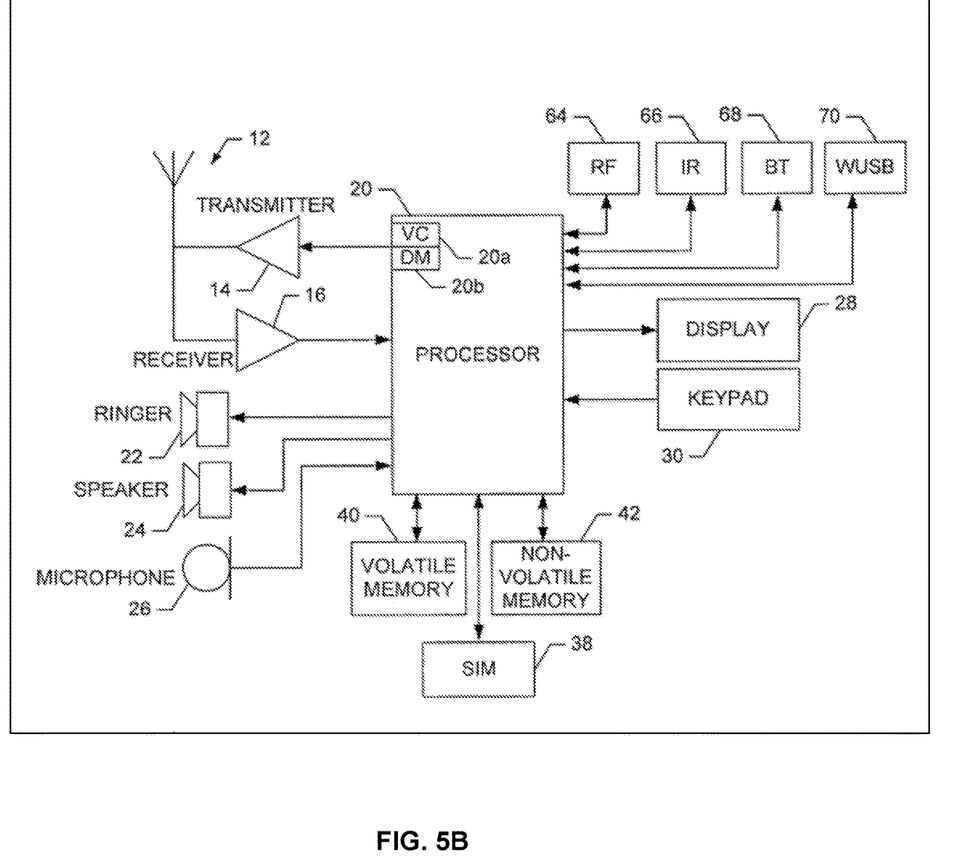
FIG. 5B depicts an example of an apparatus, in accordance with some example embodiments.

FIG. 5B illustrates a block diagram of an apparatus 10, in accordance with some example embodiments. The apparatus 10 may represent a user equipment or other type of similar user side node or element, an example of which is noted above with respect to user equipment 104.

For example, the apparatus may be configured to receive an indication of a codepoint activation, wherein the codepoint activation indicates that a transmission configuration indicator state being activated is associated with a second physical cell identifier different from a first physical cell identifier of a serving cell of the apparatus. The apparatus may be further configured to at least: in response to the transmission configuration indicator state being activated in association with the second physical cell identifier, suspend control channel monitoring of at least one set of core resources associated with the first physical cell identifier of the serving cell of the apparatus. Moreover, the apparatus may monitor another control channel associated with the transmission configuration indicator state being activated for the second physical cell identifier. The monitoring may include transmission configuration indicator activations for a physical downlink shared channel associated with the second physical cell identifier. The apparatus may monitor at least one other set of core resources associated with the transmission configuration indicator state within the second physical cell identifier of a non-serving cell. The suspending may further include suspending the monitoring of candidates of a search space set of the at least one set of control resource set resources associated with the first physical cell identifier of the serving cell of the apparatus. A timer may be configured to provide a time during which the apparatus ignores at least one transmission configuration indicator state change that is not within the second physical cell identifier. Based on the expiry of the timer, the apparatus may apply the at least one transmission configuration indicator state change that is not within the second physical cell identifier. When the apparatus is configured to monitor the data channels from two different cells, the apparatus may be configured to apply, to the data channels from the two different cells, at least one transmission configuration indicator state. The suspending may further include: excluding at least a first reference signal for beam failure detection associated with the first physical cell identifier of the serving cell, and/or including at least one other reference signal for beam failure detection associated with the second physical cell identifier of a non-serving cell. The suspending may be in response to a trigger received by the apparatus or a condition detected by the apparatus, and in response to the trigger or the condition, the apparatus may monitor another control channel associated with the transmission configuration indicator state being activated for the second physical cell identifier.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5B as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including the process at FIG. 3).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be: reduced UE complexity and/or reduction in PDCCH monitoring ambiguity.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
receiving, at a user equipment, an indication of a codepoint activation, wherein the codepoint activation indicates that a transmission configuration indicator state being activated is associated with a second physical cell identifier different from a first physical cell identifier of a serving cell of the user equipment;
in response to the transmission configuration indicator state being activated in association with the second physical cell identifier, suspending control channel monitoring of at least one control resource set associated with the first physical cell identifier of the serving cell of the user equipment;
ignoring, for a time period, transmission configuration indicator state changes for other physical cell identifier values different from the second physical cell identifier;
configuring a timer set to the time period during which the user equipment ignores the transmission configuration indicator state changes for other physical cell identifier values different from the second physical cell identifier, and
applying, based on expiry of the timer, transmission configuration indicator state changes for other physical cell identifier values different from the second physical cell identifier.

2. The method of claim 1 further comprising:
monitoring, by the user equipment, another control channel associated with the transmission configuration indicator state being activated for the second physical cell identifier.

3. The method of claim 2 further comprising:
monitoring, by the user equipment, for transmission configuration indicator activations for a physical downlink shared channel associated with the second physical cell identifier.

4. The method of claim 1 further comprising:
monitoring, by the user equipment, at least one other control resource set associated with the transmission configuration indicator state within the second physical cell identifier of a non-serving cell.

5. The method of claim 1, wherein the suspending further comprises suspending the monitoring of a search space set for downlink control information candidates on the at least one control resource set associated with the first physical cell identifier of the serving cell of the user equipment.

6. The method of claim 1 further comprising:
starting the timer when receiving the transmission configuration indicator state associated with the second physical cell identifier.

7. The method of claim 1, wherein when the user equipment is configured to monitor data channels from two different cells, the user equipment is configured to apply, to the data channels from the two different cells, at least one transmission configuration indicator state.

8. The method of claim 1, wherein the suspending further comprises:
excluding at least a first reference signal for beam failure detection associated with the first physical cell identifier of the serving cell; and
including at least one other reference signal for beam failure detection associated with the second physical cell identifier of a non-serving cell.

9. The method of claim 1, wherein the suspending is in response to a trigger received by the user equipment or a condition detected by the user equipment; and
in response to the trigger or the condition, monitoring, by the user equipment, another control channel associated with the transmission configuration indicator state being activated for the second physical cell identifier.

10. An apparatus comprising a user equipment, the apparatus comprising:
at least one processor; and at least one memory including computer program code, the at least one memory and the computer program code configured to, with the at least one processor, cause the user equipment to at least:
receive an indication of a codepoint activation, wherein the codepoint activation indicates that a transmission configuration indicator state being activated is associated with a second physical cell identifier different from a first physical cell identifier of a serving cell of the user equipment;

in response to the transmission configuration indicator state being activated in association with the second physical cell identifier, suspend control channel monitoring of at least one control resource set associated with the first physical cell identifier of the serving cell of the user equipment;

ignore, for a time period, transmission configuration indicator state changes for other physical cell identifier values different from the second physical cell identifier;

configure a timer set to the time period during which the user equipment ignores the transmission configuration indicator state changes for other physical cell identifier values different from the second physical cell identifier, and apply, based on expiry of the timer, transmission configuration indicator state changes for other physical cell identifier values different from the second physical cell identifier.

11. The apparatus of claim 10, wherein the user equipment is further caused to at least:

monitor another control channel associated with the transmission configuration indicator state being activated for the second physical cell identifier.

12. The apparatus of claim 10, wherein the user equipment is further caused to at least:

monitor for transmission configuration indicator activations for a physical downlink shared channel associated with the second physical cell identifier.

13. The apparatus of claim 10, wherein the user equipment is further caused to at least:

monitor at least one other control resource set associated with the transmission configuration indicator state within the second physical cell identifier of a non-serving cell.

14. The apparatus of claim 10, wherein the user equipment is further caused to at least:

suspend monitoring of a search space set for downlink control information candidates on the at least one control resource set associated with the first physical cell identifier of the serving cell of the user equipment.

15. The apparatus of claim 10, wherein the user equipment is further configured to at least:

start the timer when receiving the transmission configuration indicator state associated with the second physical cell identifier.

16. The apparatus of claim 10, wherein when the user equipment is configured to monitor data channels from two different cells, the user equipment is configured to apply, to the data channels from the two different cells, at least one transmission configuration indicator state.

17. The apparatus of claim 10, wherein the user equipment is further caused to at least:

exclude at least a first reference signal for beam failure detection associated with the first physical cell identifier of the serving cell; and include at least one other reference signal for beam failure detection associated with the second physical cell identifier of a non-serving cell.

18. The apparatus of claim 10, wherein the user equipment is further caused to at least:

suspend the control channel monitoring in response to a trigger received by the user equipment or a condition detected by the user equipment; and in response to the trigger or the condition, monitor another control channel associated with the transmission configuration indicator state being activated for the second physical cell identifier.

* * * * *